June 15, 1965  C. A. VIKTORSSON  3,188,977
STORAGE SYSTEM
Filed Dec. 31, 1962  2 Sheets-Sheet 1

INVENTOR.
Carl Akan Viktorsson
BY
his ATTORNEY

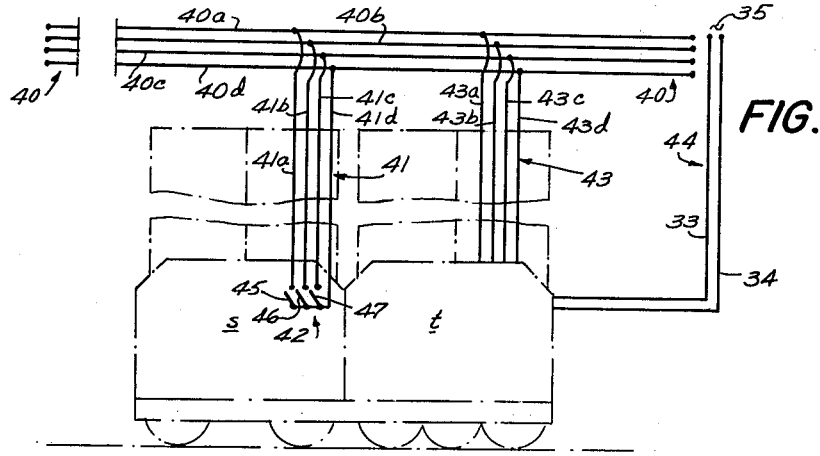
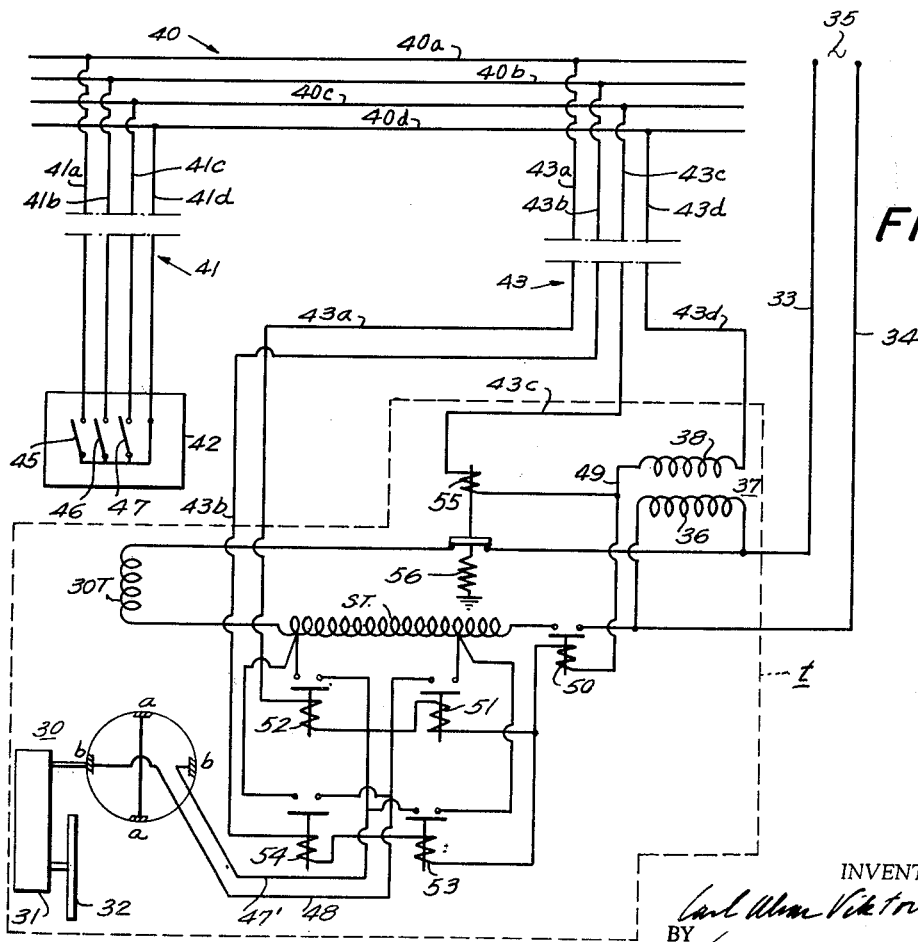

United States Patent Office
3,188,977
Patented June 15, 1965

3,188,977
STORAGE SYSTEM
Carl Alvar Viktorsson, Säffle, Sweden, assignor to Aktiebolaget Electrolux, Stockholm, Sweden, a corporation of Sweden
Filed Dec. 31, 1962, Ser. No. 248,482
13 Claims. (Cl. 104—235)

My invention relates to storage systems.

When storing files, books, literature, luggage and other items in warehouses, garages, file rooms and similar storage places, it is desirable to provide an arrangement in which a maximum number of storage units can be employed in an area or space of a given size. It has been proposed heretofore to provide storage units which can be positioned closely adjacent to one another and shifted at will to provide an access path between any two adjacent storage units to store or remove items from a particular storage unit. Stationary storage units may be provided at the walls of enclosures, the movable storage units being movable toward and from the stationary ones to provide a compact arrangement of the units.

When storage units and their contents are relatively heavy, it usually has been the practice to employ mechanical equipment which is driven by an electric motor to move the storage units at will and provide an access path to a particular one. The mechanical equipment of this type heretofore provided usually has been complicated and considerable construction work is required to locate the driving equipment beneath the floor of the space or enclosure in which the storage units are installed. This location of the driving equipment for the storage units is objectionable and expensive because the floor above the driving equipment has to be of adequate depth and of special construction to accommodate it.

An object of my invention is to provide an improved storage system which is of simplified construction. I accomplish this by providing a reversible electric motor on one of the movable storage units which functions as a driving unit and can be detachably connected to one or more movable storage units which function as driven units and are arranged in a row with the driving unit. The electric motor forms part of driving mechanism associated with the driving unit which can be controlled from a control panel on each driven unit to render the electric motor operable to move the driving unit forward and rearward and to render the electric motor inoperable to move the driving unit, whereby the storage system can be operated from the exact point at which it is desired to form an access path of desired width to a particular storage unit.

Further objects and advantages of my invention will become apparent as the following description proceeds, and the features of novelty which characterize my invention will be pointed out with particularity in the claims annexed to and forming a part of this specification.

The novel features I believe to be characteristic of my invention are set forth with particularity in the claims. The invention, both as to organization and method, together with the objects and advantages thereof, will be better understood by reference to the following description taken in connection with the accompanying drawings, of which:

FIGS. 3 and 4 are enlarged fragmentary views of parts shown in FIG. 1 to illustrate details more clearly;

FIG. 5 is a diagrammatic representation of an electric motor and control provisions therefor which are provided on the movable storage units shown in FIGS. 1 to 4.

Figure 1:
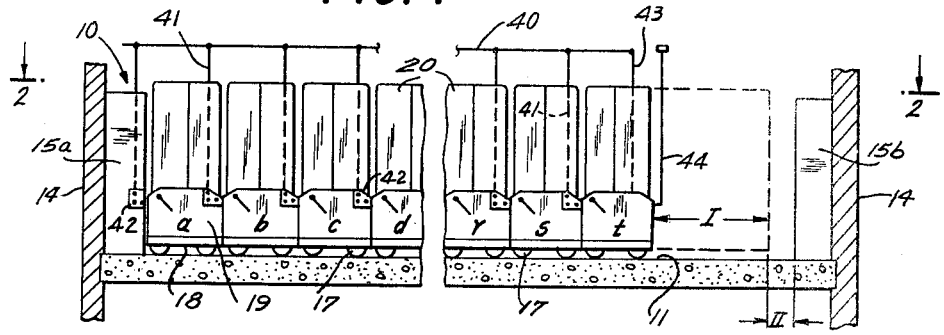
FIG. 1 is a vertical sectional view, partly broken away, of an enclosure diagrammatically illustrating in side elevation a storage system embodying my invention.
Figure 2:
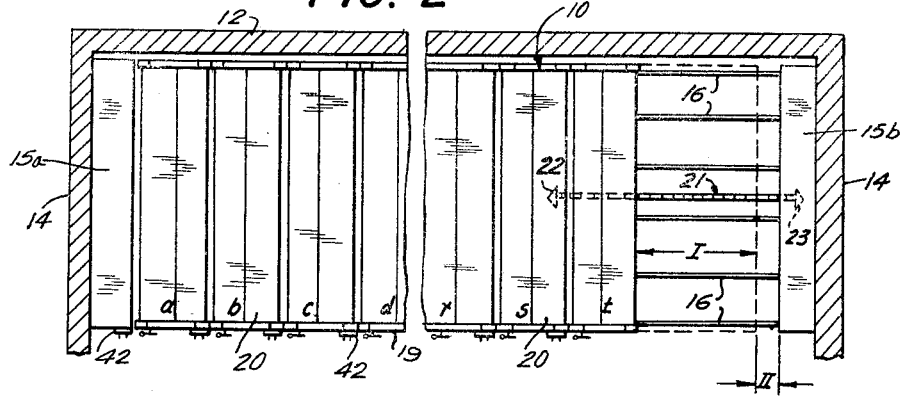
FIG. 2 is a horizontal sectional view taken at the line 2—2 of FIG. 1 illustrating the storage system in plan view.

Referring to FIGS. 1 and 2, a storage system embodying my invention is provided in an enclosure 10 having a floor 11, an end wall 12 and opposing side walls 14 normal to the end wall. Upright stationary storage units 15a and 15b are located at the opposing side walls 14 closely adjacent to the end wall 12. A number of spaced rails 16, which are parallel to the end wall 12 and extend between the stationary storage units 15a and 15b, are mounted on the floor 11. The rails 16, six of which are shown in FIG. 2, provide tracks for a number of movable storage units a to t each having a pair of rollers or wheels 17 adapted to ride on each one of the rails 16. Each of the twenty movable storage units, units a, b, c, d, r, s and t of which are seen in FIGS. 1 and 2, comprises a truck frame 18 upon which the wheels 17 are journaled and an upright side wall 19. Upright storage receptacles 20, which are supported on the movable storage units, may be provided with pallets (not shown) which can be mounted on and removed from the storage units in any suitable manner, as by a fork-type truck, for example.

The stationary storage units 15a and 15b and the upright storage receptacles 20 mounted on and forming parts of the movable storage units a to t may be subdivided in any suitable manner for storing files, books, literature, luggage, and other items, for example, in warehouses, garages, file rooms and similar storage places.

The top suface of the floor 11 is recessed to form an open groove which has a bottom and opposing sides extending upward therefrom and receives an open-linked chain 21 which is parallel to and removed from the end wall 12, the top of the chain being substantially flush with the surface of the floor. As best seen in FIG. 2, the open-linked chain 21 extends from a region adjacent to the right-hand wall 14 toward the left-hand wall 14 and its ends are secured to the floor 11 at 22 and 23, respectively, to maintain the chain in a fixed position thereon.

Figure 3:
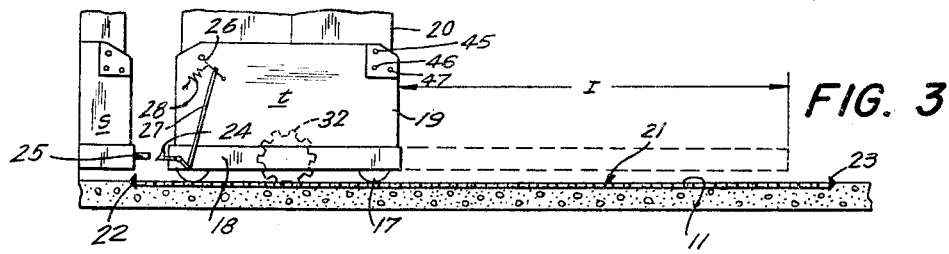

The storage units a to t are adapted to be removably connected to one another by any suitable coupling mechanism. As shown in FIG. 3, adjacent storage units may be connected by cooperating coupling hooks 24 and rings 25 of a type which automatically lock together when the frames 18 of the adjacent storage units are moved into abutting relation. Each pivotally mounted coupling hook 24 may be disengaged from the coupling ring 25 of the adjacent storage unit by independent uncoupling mechanism which includes a handle 26 pivotally mounted on the side wall 19 and connected by linkage mechanism 27 to the coupling hook 24. The handle 26 may be biased to its lower position shown in FIG. 3, as by a spring 28, for example, to maintain the coupling hook 24 in a substantially horizontal position in which its nose end will automatically receive and hold the ring 25 of the adjacent storage unit when the coupling parts are moved toward one another. When the handle 26 is raised against the biasing action of the spring 28, the coupling hook 24 is depressed and becomes disengaged from the coupling ring 25 of the adjacent storage unit.

In accordance with my invention, structure is provided for maneuvering the movable storage units a to t with the storage unit t functioning as a self-propelled storage unit which is movable forward and backward by itself and can also be employed at will to impart forward and backward movement to one or more of the remaining storage units a to s which may be referred to as driven storage units. With this arrangement, an access path may be provided at any zone or region of the storage system to gain access to a particular movable storage receptacle 20 or stationary storage unit 15a or 15b. In order that the self-propelled storage unit t will selectively impart movement to one or more of the driven storage units a to s, each driven storage unit is provided with suitable controls for rendering the self-propelled storage unit t operable to move forward and backward and also stop quickly at a desired point in its path of movement whereby an access path to a particular storage unit can be provided at a desired place in the row of storage units by operating the handle 26 of the uncoupling mechanism and the controls at the desired place.

Referring to FIGS. 3 and 5, the self-propelled storage unit t is provided with an electric motor 30 which is arranged, through suitable reduction gearing 31, to drive a sprocket gear 32. The sprocket gear 32 cooperates with the open-linked chain 21 to move the storage unit t forward and backward on the rails 16. The electric motor 30 is connected by conductors 33 and 34 to an alternating current source of supply 35. Across the conductors 33 and 34 is connected the primary winding 36 of a step-down transformer 37, the secondary winding 38 of which is employed as a source of electrical energy for a control circuit for controlling the electric motor 30 of the self-propelled storage unit t. With this arrangement, the electric motor 30 is adapted to be operated at the normal voltage of the source of electrical supply whereas the control circuit, which includes flexible and movable cables as will be described presently, is adapted to be operated at a low voltage of fifty volts, for example.

As shown in FIG. 1, a flexible electric cable 40 extends lengthwise of the storage system. The cable 40 may be located at or near the floor 11 at the vicinity of the end wall 12 and extends from the vicinity of one side wall 14 to the vicinity of the opposing side wall 14. To the electric cable 40 are connected the ends of flexible cables 41, the opposite ends of which are connected to control panels 42 provided on the walls 19 of the driven storage units a to s. To the electric cable 40 is also connected one end of a cable 43, the opposite end of which is connected to the self-propelled storage unit t. The conductors 33 and 34 for supplying electrical energy to the motor 30 from the source of supply 35, which are insulated from one another, form a flexible cable 44. Each of the flexible cables 41, 43 and 44 is of sufficient length to permit the movable storage unit to which it is connected to move freely along the rails 16 for the distance I lengthwise of the rails. Further, one of the electric cables 41 is connected at one end to the cable 40 and at its opposite end to the control panel 42 on the stationary storage unit 15a which is similar to the control panels 42 on the driven storage units a to s.

As shown in FIGS. 4 and 5, the electric cable 40 comprises four electrical conductors 40a, 40b, 40c and 40d, the flexible electric cables 41 comprise four electrical conductors 41a, 41b, 41c and 41d, and the electric cable 43 comprises four electrical conductors 43a, 43b, 43c and 43d, the electrical conductors of each cable being insulated from one another.

Each of the control panels 42 is provided with three switches 45, 46 and 47 for controlling the operation of the driving motor 30 on the self-propelled storage unit t. The switch 45 is arranged to complete a circuit for the motor 30 to render the latter operable to propel or drive the storage unit t in a forward direction toward the right-hand stationary storage unit 15b, and the switch 46 is arranged to complete a circuit for the motor 30 to render the latter operable to propel or drive the storage unit t in a backward direction toward the left-hand stationary storage unit 15a. The switch 47 may be referred to as an emergency switch which functions to disconnect the motor 30 from the source of electrical supply 35 and promptly stop the movement of storage unit t at a particular point in its path of travel along the rails 16.

The electric motor 30 may be of any conventional type, and by way of example I have shown a Winter-Eichberg compensated repulsion motor having a stator winding 30T, the direction of rotation of which is reversed by reversing the connections 47′ and 48 of the brushes b—b with the series transformer S.T. When the switch 45 on any one of the control panels 42 is closed, a circuit is completed for the motor 30 to render it operable to drive the storage unit t in one direction, for example, the forward direction toward the stationary storage unit 15b. As shown in FIG. 5, the control circuit completed when one of the switches 45 is closed, starting from one side of the switch, includes conductors 41d, 40d and 43d which is connected to one terminal of the secondary winding 38 of the step-down transformer 37. From the opposite terminal of the secondary winding 38, the completed circuit includes conductor 49, relays 50, 51 and 52, and conductors 43a, 40a, and 41a back to the other side of the switch 45. The completion of the control circuit, upon closing switch 45, energizes relay 50 to connect the motor 30 by conductors 33 and 34 to the electrical source of supply 35 and also energizes relays 51 and 52 to connect conductors or connections 47′ and 48 from the brushes b—b to the left-hand and right-hand ends, respectively, of the series transformer S.T.

When the switch 46 on any one of the control panels 42 is closed, a circuit is completed from the motor 30 to render it operable to drive the storage unit t in the opposite direction which, in the embodiment being described, is the rearward direction toward the stationary storage unit 15a. As shown in FIG. 5, the control circuit completed when one of the switches 46 is closed, starting from one side of the switch, includes condutcors 41d, 40d, and 43d which is connected to the secondary winding 38 of the transformer 37. From the secondary winding 38 the completed circuit being described includes conductor 49, relays 50, 53 and 54, and conductors 43b, 40b and 41b back to the other side of the switch 46. The completion of this control circuit, upon closing switch 46, energizes relay 50 to connect the motor 30 to the electrical source of supply 35 and also energizes relays 53 and 54 to connect the conductors or connections 47′ and 48 from the brushes b—b to the right-hand and left-hand ends, respectively, of the series transformer S.T., thus reversing the direction of rotation of the motor 30 from that when switch 45 is closed.

When the switch 47 on any one of the control panels 42 is closed, the motor 30 is disconnected at once from the source of electrical supply 35. The control circuit completed when switch 47 is closed, starting from one side of the switch, includes conductors 41d, 40d and 43d to one terminal of the secondary transformer winding 38. From the opposite terminal of the secondary winding 38, the completed control circuit being described includes conductor 49, normally closed relay 55, and conductors 43c, 40c, and 41c back to the other side of the switch 47. Hence, when any one of the switches 47 is closed, relay 55 will be energized and move from its normally closed position to an open position against the biasing action of a spring 56 to open conductor 33 and disconnect the motor 30 from the source of electrical supply 35 and thus stop the motor immediately.

It will be evident that when the switches 45 and 46 are open, the motor 30 will be disconnected from the source of electrical supply 35. When any one of the switches 45 or 46 is closed and the motor 30 is rendered operative to drive the storage unit t forward or backward, movement of the storage unit t can always be instantly stopped by closing any one of the switches 47 or by opening whichever of the switches 45 and 46 that had been previously closed to render the motor 30 operable to propel and move the storage unit t.

In FIGS. 1 and 3 the driven storage unit s and driving unit t are next to one another. When the coupling mechanism 24, 25 connecting the storage units *s* and *t* is operated to uncouple these storage units and the switch 45 on control panel 42 of the storage unit *s* is closed, a circuit will be completed in the manner described above to energize motor 30 and render the latter operable to drive the storage unit *t* forward toward stationary storage unit 15*b*. From a position next to storage unit *s* the storage unit *t* can move forward on the chain 21 for the distance I. When the storage unit *t* has traveled forward the distance I, switch 45 is opened or switch 47 is closed to deenergize the motor 30 and bring the storage unit *t* to a stop.

By moving the storage unit *t* forward from a position next to the storage unit *s*, an access path or aisle is provided between the storage units *s* and *t*. An access path between any one of the storage units *a* to *t* and an adjacent movable storage unit or the stationary storage unit 15*a* can be formed by connecting the appropriate number of movable storage units and closing one of the switches 45 on the control panel 42 of the storage unit from which the movable storage units will be driven forward by the storage unit *t* to form an access path. Therefore, an access path to a particular storage unit can be provided at any place along the row of units *a* to *t* by operating the handle 26 of uncoupling mechanism and the control panel 42 on a driven storage unit at the exact point the access path is desired. Each access path formed in this way can be closed again by subsequently closing the switch 46 on the control panel 42 of the storage unit at the far side of the access path with respect to the storage unit *t*. This will render the motor 30 operable to drive the storage unit *t* and other movable storage units connected thereto in a rearward direction toward the stationary storage unit 15*a* and close the access path. When the access path previously formed is closed, switch 46 is opened or switch 47 is closed to deenergize the motor 30 and bring the driving storage unit *t* to a stop.

When the storage unit *t* is moved forward on the chain 21 toward the stationary storage unit 15*b* for the distance I, as indicated in FIGS. 1 and 2, a space II is formed between the storage unit *t* and the stationary storage unit 15*b* which may be referred to as a safety zone.

Figure 6:
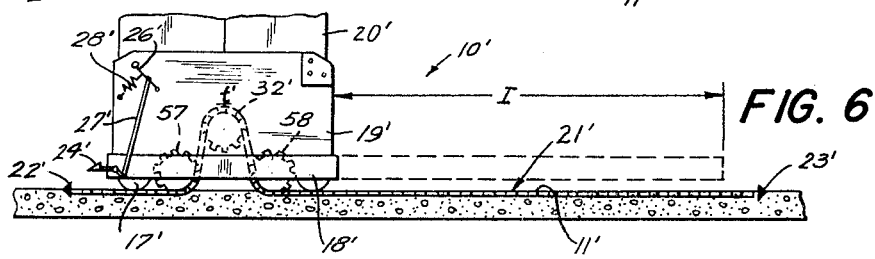
FIG. 6 is a fragmentary view similar to FIG. 3 illustrating a modification of the embodiment shown in FIGS. 1 to 3.

In FIG. 6 I have shown a modification of the invention in which the storage unit *t'* is provided with a sprocket wheel 32' which is driven by the motor 30. The openlinked chain 21' is disposed in a recess in the floor 11' with the top of the chain substantially flush with the surface of the floor. The ends of the chain 21' are secured to the floor 11' at 22' and 23', as in the first-described embodiment. In the modification of FIG. 6 the chain 21' includes essentially straight portions at each side of the storage unit *t'* and an intermediate circular portion which is disposed about the sprocket wheel 32' and engaged by the peripheral portion of the sprocket wheel remote from the two essentially straight portions of the chain 21'. Rotatable idler wheels 57 and 58 are journaled on the frame 18' of the driving unit *t'* at each side of the sprocket wheel 32' to hold the straight portions of the chain in position on the floor 11' with the regions of the chain between the straight portions and the intermediate circular portion engaging the idler wheels.

While I have shown and described particular embodiments of my invention, it will be obvious to those skilled in the art that modifications and changes may be made without departing from the invention, and I therefore aim in the following claims to cover all such modifications and changes as fall within the true scope of my invention.

I claim:

1. The combination with a storage system comprising a plurality of movable storage units which are horizontally disposed in a row, a plurality of means for detachably connecting the units in the row, each of the connecting means functioning to couple two adjacent units in the row when they are moved together, and independent uncoupling mechanism operatively associated with each of the connecting means to render the latter inoperable to couple two adjacent units in the row, each uncoupling mechanism being mounted on one of the two adjacent units connected by the detachable connecting means with which it is operatively associated, of structure for maneuvering the units in the row to provide an access path to a particular storage unit, said maneuvering structure comprising means for propelling a single unit in the row, said propelling means including driving mechanism and a reversible electric motor which is mounted on the single propelled unit and operatively associated with the driving mechanism, the single propelled unit functioning as a driving unit and the other units in the row functioning as driven units, and control means on each of the driven units for selectively controlling the driving unit, the aforementioned control means on each of the driven units including means for rendering the propelling means operable to move the driving unit forward and rearward and for rendering the propelling means inoperable to move the driving unit.

2. The combination with a storage system comprising a plurality of movable storage units which are horizontally disposed in a row, a plurality of means for detachably connecting the units in the row, each of the connecting means functioning to couple two adjacent units in the row when they are moved together, and independent uncoupling mechanism operatively associated with each of the connecting means to render the latter inoperable to couple two adjacent units in the row, each uncoupling mechanism being mounted on one of the units connected by the detachable connecting means with which it is operatively associated, of structure for maneuvering the units in the row to provide an access path to a particular storage unit, said maneuvering structure comprising means for propelling a single unit in the row, said propelling means including driving mechanism and a reversible electric motor which is mounted on the single propelled unit and operatively associated with the driving mechanism, the single propelled unit functioning as a driving unit and the other units in the row functioning as driven units, and electrical control means on each of the driven units for selectively controlling the motor on the driving unit, the aforementioned electrical control means on each of the driven units including means for rendering the motor operable to move the driving unit forward and rearward and for rendering the motor inoperable to move the driving unit.

3. The combination with a storage system comprising a plurality of movable storage units which are horizontally disposed in a row, a stationary storage unit at least at one end of the row, the movable units being movable toward and from the stationary unit, a plurality of means for detachably connecting the movable units in the row, each of the connecting means functioning to couple two adjacent movable units in the row when they are moved together, and uncoupling mechanism operatively associated with each connecting means to render the latter inoperable to couple two adjacent movable units in the row, each uncoupling mechanism being mounted on one of the movable units connected by the detachable connecting means with which it is operatively associated, of structure for maneuvering the movable units in the row to provide an access path to a particular storage unit, said maneuvering structure comprising means for propelling a single unit in the row, said propelling means including driving mechanism and a reversible electric motor which is mounted on the single propelled unit and operatively associated with the driving mechanism, the single propelled unit functioning as a driving unit and the other units in the row functioning as driven units, and control means on each of the driven units and the stationary unit for selectively controlling the driving unit, the aforementioned control means on each of the driven units and the stationary unit including means for rendering the propelling means operable to move the driving unit forward and rearward and for rendering the propelling means inoperable to move the driving unit.

4. The combination with a storage system comprising a plurality of movable storage units which are horizontally disposed in a row, a stationary storage unit at least at one end of the row, the movable units being movable toward and from the stationary unit, a plurality of means for detachably connecting the movable units in the row, each of the connecting means functioning to couple two adjacent movable units in the row when they are moved together, and uncoupling mechanism operatively associated with each connecting means to render the latter inoperable to couple two adjacent movable units in the row, each uncoupling mechanism being mounted on one of the movable units connected by the detachable connecting means with which it is operatively associated, of structure for maneuvering the movable units in the row to provide an access path to a particular storage unit, said maneuvering structure comprising means for propelling a single movable unit in the row, said propelling means including driving mechanism and a reversible electric motor which is mounted on the single propelled unit and operatively associated with the driving mechanism, the single propelled unit functioning as a driving unit and the other movable units functioning as driven units, and electrical control means on each of the driven units for selectively controlling the driving unit, the aforementioned electrical control means on each of the driven units including means for rendering the motor operable to move the driving unit forward and rearward and for rendering the motor inoperable to move the driving unit.

5. The combination with a storage system comprising a plurality of movable storage units which are horizontally disposed in a row, a plurality of means for detachably connecting the units in the row, each of the connecting means functioning to couple two adjacent units in the row when they are moved together, and independent uncoupling mechanism operatively associated with each of the connecting means to render the latter inoperable to couple two adjacent units in the row, each uncoupling mechanism being mounted on one of the two adjacent units connected by the detachable connecting means with which it is operatively associated, of structure for maneuvering the units in the row to provide an access path to a particular storage unit, said maneuvering structure comprising means for propelling a single unit in the row, said propelling means including a rotatable member and means including a reversible electric motor for driving the rotatable member, the rotatable member and motor being mounted on the single propelled unit and movable therewith, an elongated member which is maintained in a fixed lengthwise position with respect to the row of movable units and coacts with the rotatable member and functions to move the single propelled unit when the rotatable member coacting therewith is driven by the motor, the single propelled unit functioning as a driving unit and the other units in the row functioning as driven units, and electrical control means on each of the driven units for selectively controlling the motor on the driving unit, the aforementioned electrical control means on each of the driven units including means for rendering the motor operable to move the driving unit forward and rearward and for rendering the motor inoperable to move the driving unit.

6. The combination with a storage system comprising a plurality of movable storage units which are horizontally disposed in a row, a plurality of means for detachably connecting the units in the row, each of the connecting means functioning to couple two adjacent units in the row when they are moved together, and independent uncoupling mechanism operatively associated with each of the connecting means to render the latter inoperable to couple two adjacent units in the row, each uncoupling mechanism being mounted on one of the two adjacent units connected by the detachable connecting means with which it is operatively associated, of structure for maneuvering the units in the row to provide an access path to a particular storage unit, said maneuvering structure comprising means for propelling a single unit in the row, said propelling means including a rotatable sprocket wheel and a reversible electric motor for driving the rotatable sprocket wheel, the rotatable sprocket wheel and motor being mounted on the single propelled unit and movable therewith, a chain which is maintained in a fixed lengthwise position with respect to the row of movable units and coacts with the rotatable sprocket wheel and functions to move the single propelled unit when the rotatable sprocket wheel coacting therewith is driven by the motor, the single propelled unit functioning as a driving unit and the other units in the row functioning as driven units, and electrical control means on each of the driven units for selectively controlling the motor on the driving unit, the aforementioned electrical control means on each of the driven units including means for rendering the motor operable to move the driving unit forward and rearward and for rendering the motor inoperable to move the driving unit.

7. The combination set forth in claim 6 in which the chain is essentially straight with all parts thereof substantially at the same level.

8. The combination with a storage system comprising a plurality of movable storage units which are horizontally disposed in a row, a plurality of means for detachably connecting the units in the row, each of the connecting means functioning to couple two adjacent units in the row when they are moved together, and independent uncoupling mechanism operatively associated with each of the connecting means to render the latter inoperable to couple two adjacent units in the row, each uncoupling mechanism being mounted on one of the two adjacent units connected by the detachable connecting means with which it is operatively associated, of structure for maneuvering the units in the row to provide an access path to a particular storage unit, said maneuvering structure comprising means for propelling a single unit in the row, said propelling means including a rotatable member and a reversible electric motor for driving the rotatable member, the rotatable member and motor being mounted on the single propelled unit and movable therewith, an elongated member which is maintained in a fixed lengthwise position with respect to the row of movable units and coacts with the rotatable member and functions to move the single propelled unit when the rotatable member coacting therewith is driven by the motor, the single propelled unit functioning as a driving unit and the other units in the row functioning as driven units, a main circuit including flexible conductors for connecting the motor to an alternating current source of supply at a given voltage, a control circuit adapted to be connected to an alternating current source of supply at a lower voltage than the given voltage, the control circuit including first conductors extending lengthwise of the row of the movable units and second flexible conductors connecting the first conductors and parts of the control circuit mounted on the driving unit and groups of flexible third conductors which are connected in parallel with the first conductors, each of the groups of the third flexible conductors being connected to electrical control means on a different one of the driven units, the parts of the control circuit on the driving unit being associated with the main circuit for controlling the motor, and means comprising the control circuit and the electrical control means on each of the driven units for selectively controlling the motor on the driving unit, the aforementioned electrical control means on each of the driven units including means associated with the control circuit for rendering the motor operable to move the driving unit forward and rearward and for rendering the motor inoperable to move the driving unit.

9. The combination with a storage system comprising structure having a floor, a plurality of storage units, means for supporting the units on the floor for movement in a substantially straight path, the units being horizontally disposed in a row, a plurality of means for detachably connecting the units in the row, each of the connecting means functioning to couple two adjacent units in the row when they are moved together, and uncoupling mechanism operatively associated with each of the connecting means to render the latter inoperable to couple two adjacent units in the row, of structure for maneuvering the units in the row to provide an access aisle to a particular storage unit, said maneuvering structure comprising means for propelling a single unit in the row, the single propelled unit functioning as a driving unit and the other units in the row functioning as driven units, said propelling means including a rotatable member and means including a reversible electric motor for driving the rotatable member, the rotatable member and motor being mounted on the driving unit and movable therewith, and an elongated member comprising a chain which is disposed on the floor at the vicinity of the top surface thereof and extends lengthwise with respect to the path of movement of the units, means for fastening the ends of the elongated member to the floor to maintain the chain in a fixed position thereon, and the chain intermediate the ends thereof coacting with the rotatable member and functioning to move the driving unit when the rotatable member coacting therewith is driven by the motor.

10. The combination set forth in claim 9 in which the floor at the top surface thereof is formed with an elongated groove which extends lengthwise of the path of movement of the units, the chain being disposed in the groove.

11. The combination set forth in claim 10 in which said rotatable member comprises a sprocket wheel journaled at one level of the driving unit and the floor is formed with an open groove which extends lengthwise of the path of movement of the units and includes a bottom and opposing side walls extending upward therefrom, rotatable idler wheels mounted on the driving unit below the one level and at opposite sides of the sprocket wheel, the chain including essentially straight portions disposed in the groove and an intermediate circular portion which is disposed about the sprocket wheel and engages the top peripheral portion thereof, the regions of the chain between the straight portions and the intermediate circular portion being disposed about the idler wheels and engaging the bottom peripheral portions thereof.

12. The combination set forth in claim 9 which comprises an electrical control on each of the driven units for selectively controlling the motor on the driving unit, and the aforementioned electrical control on each of the driven units including means for rendering the motor operable to move the driving unit forward and rearward and for rendering the motor inoperable to move the driving unit.

13. The combination set forth in claim 9 which comprises a main circuit including the motor adapted to be connected to a source of electrical energy, a secondary control circuit adapted to be connected to a source of electrical energy, the control circuit including first conductors extending lengthwise of the row of the movable units and second flexible conductors connecting the first conductors and parts of the control circuit mounted on the driving unit and groups of flexible third conductors which are connected in parallel with the first conductors, each of the groups of the third flexible conductors being connected to electrical control means on a different one of the driven units, the parts of the control circuit on the driving unit being associated with the main circuit for controlling the motor, and means comprising the control circuit and the electrical control means on each of the driven units for selectively controlling the motor on the driving unit, the aforementioned electrical control means on each of the driven units including manually operable means for rendering the motor operable to move the driving unit forward and rearward and for rendering the motor inoperable to move the driving unit.

References Cited by the Examiner
UNITED STATES PATENTS

| | | | |
|---|---|---|---|
| 218,681 | 8/79 | Michael et al. | 213—89 |
| 1,487,884 | 3/24 | Poirier | 104—235 |
| 1,887,667 | 11/32 | Wheeler. | |
| 1,989,920 | 2/35 | Fildes | 105—366 |
| 2,821,146 | 1/58 | Mahrle et al. | 104—148 |
| 2,841,093 | 7/58 | Camp | 104—235 |
| 2,863,397 | 12/58 | Billings | 104—50 |
| 3,055,313 | 9/62 | Stoll et al. | 104—162 |
| 3,080,204 | 3/63 | Lindhgren | 104—162 X |
| 3,103,896 | 9/63 | Zebley et al. | 104—173 |

LEO QUACKENBUSH, *Primary Examiner.*